United States Patent [19]

Anzai et al.

[11] 4,086,983

[45] May 2, 1978

[54] ELEVATOR CONTROL SYSTEM

[75] Inventors: Nobuo Anzai; Eiki Watanabe, both of Inazawa, Japan

[73] Assignee: Mitsubishi Denki Kabushiki Kaisha, Tokyo, Japan

[21] Appl. No.: 602,310

[22] Filed: Aug. 6, 1975

[30] Foreign Application Priority Data

Aug. 27, 1974  Japan ................................. 49-98699

[51] Int. Cl.² ............................................ H02K 27/28
[52] U.S. Cl. ..................................... 187/29 R; 318/250
[58] Field of Search ............................. 187/29; 310/72; 318/228, 230, 231, 245, 249, 250, 253, 307, 353, 438, 439, 246, 248, 347, 348, 294

[56] References Cited

U.S. PATENT DOCUMENTS 1,966,077  7/1934  Nyman ........................... 318/249 X

FOREIGN PATENT DOCUMENTS 625,891  5/1927  France ................................. 318/245
123,236  2/1959  U.S.S.R. .............................. 318/439

Primary Examiner—Robert K. Schaefer
Assistant Examiner—W. E. Duncanson, Jr.
Attorney, Agent, or Firm—Wenderoth, Lind & Ponack

[57] ABSTRACT

A direct current motor for an elevator car includes an armature and an interpole winding or a series field winding serially connected to the armature and controlled by a static Ward-Leonard device. A filter includes the interpole or series field winding and a series combination of a capacitor, a resistor, a reactor and a fuse with or without a series reactor.

2 Claims, 3 Drawing Figures

ELEVATOR CONTROL SYSTEM

BACKGROUND OF THE INVENTION

This invention relates to improvements in an elevator control system utilizing a thyristor type Ward-Leonard system.

In order to control elevator systems, there has been recently adopted the so-called thyristor type Ward-Leonard system in which the direct current motor for driving an elevator car is controlled by a thyristor device rather than by a conventional motor-generator unit. It is well known that, with the thyristor type Ward-Leonard system the armature current of the direct current motors for operating elevator cars include a multitude of ripples. Those ripples have a fundamental frequency generally equal to six times the frequency of the alternating current from an associated source of electric power. The flow of such a ripple current through the armature of the motor results in the generation of discordant electromagnetic noise from the motor. This noise should be as low as possible in equipment such as elevator systems installed within general buildings.

In order to reduce such noise, it has been previously known to connect a large-sized direct current reactor in the circuit with the direct current motors. If it is attempted in this way to reduce the noise to a level practically allowable by providing the direct current reactor, then the reactor is required to be fairly large-sized which inevitably becomes uneconomical.

Accordingly it is an object of the present invention to provide a new and improved elevator control system utilizing a static Ward-Leonard system and having a reduced amount of noise generated from the direct current motor involved due to the presence of the static Ward-Leonard system.

SUMMARY OF THE INVENTION

The present invention provides an elevator control system comprising a direct current motor for operating an elevator car including an armature and an interpole winding or a series field winding serially connected to the armature, and static Ward-Leonard means for controlling the direct current motor. A filter means is connected across the armature or across the interpole winding or the series field winding to remove current ripples produced due to the static Ward-Leonard means and includes, as one of the elements thereof, an inductance provided by the interpole winding or the series field winding.

BRIEF DESCRIPTION OF THE DRAWINGS

The present invention will become more readily apparent from the following detailed description taken in conjunction with the accompanying drawings in which.

Throughout the Figures like reference numerals designate identical or similar components.

DESCRIPTION OF THE PREFERRED EMBODIMENTS

Figure 1:
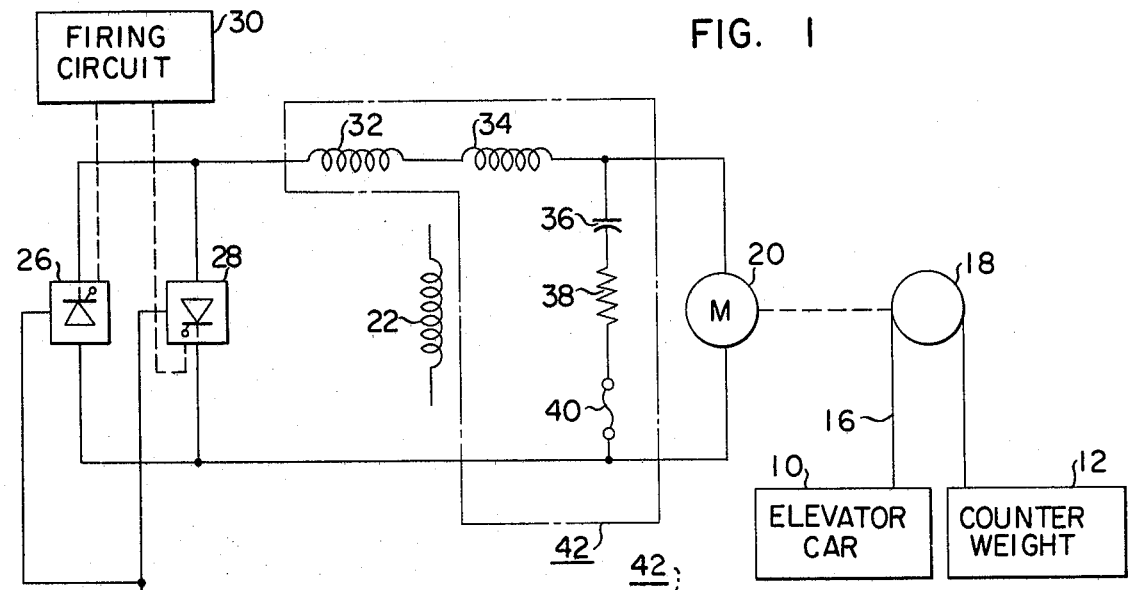
FIG. 1 is a schematic circuit diagram of an elevator control system constructed in accordance with the principles of the present invention.

Referring now to the drawings and FIG. 1 in particular, there is illustrated an elevator control system constructed in accordance with the principles of the present invention. The arrangement illustrated comprises an elevator car 10, a counter weight 12 connected to the elevator car 10 through a hoisting rope 16 and a sheave 18 over which the hoisting rope 16 runs.

The sheave 18 is connected in driven relationship to an armature 20 of a direct current type hoist motor including a shunt field winding 22. The hoist motor is adapted to drive the sheave 18 and therefore the elevator car 10. The motor armature 20 is electrically coupled to a source of three-phase alternating current 24 through a parallel combination of a converter and an inverter 26 and 28 respectively. The converter 26 includes thyristors to supply electric power from the source 24 to the motor armature 20 after rectification while the inverter 28 also includes thyristors to return regenerated power from the armature 20 to the source 24. The thyristors included in the converter and inverter 26 and 28 respectively are controlled by a firing circuit 30.

As shown in FIG. 1, a direct current reactor 32, an interpole winding 34 and the armature 20 are serially interconnected across the parallel combination of the converter and inverter 26 and 28 respectively. The reactor 32 serves to control a shortcircuit current flowing through the armature 20 if any of the thyristors in the converter 26 or the inverter 28 fail to turn off. The armature 20 has a capacitor 36, a resistor 38, reactor 44 and a fuse 40 serially interconnected thereacross.

According to the principles of the present invention, the direct current reactor 32, the interpole winding 24, the capacitor 36, the resistor 38, the reactor 44 and the fuse 40 form a filter generally designated by the reference numeral 42. Thus the armature 20 has connected thereacross a series reasonance circuit having a resonance frequency selected to be equal to or extremely close to the fundamental frequency of the ripples involved.

Since the difference in weight between the elevator car 10 and the counter weight 12 is variable, the motor armature 20 can produce a power running torque or a braking torque in accordance with the direction of travel of the elevator car 10. In order to produce a power running torque from the armature 20, the firing circuit 30 is operated to control the converter 26 to cause electric power from the source 24 to be rectified and supplied to the armature 20. Where a braking torque is to be produced by the armature 20, the firing circuit 30 is operated to control the inverter 28 to permit regenerated power from the armature 20 to be returned to the source 24. By producing a power running torque or a braking torque from the armature 20, the acceleration or deceleration of the elevator car 10 is controlled.

Inductances provided by the direct current reactor 32 and interpole winding 34 respectively, a capacitance provided by the capacitor 36 and inductance provided by the reactor 44 and a resistance exhibited by the resistor 38 cooperate with one another to absorb the ripple components of the current controlled by the converter 26 or the inverter 28. This results in a great reduction in the electromagnetic noise as above described. Also since the inductance of the interpole winding 34 complements that of the direct current reactor 32, it is possible to make the reactor 32 small-sized. Further the current flowing through the interpole winding 34 is a leading current due to the phase leading effect exhibited by the capacitor 36. This results in improvements in the commutation of the armature 20.

Figure 2:
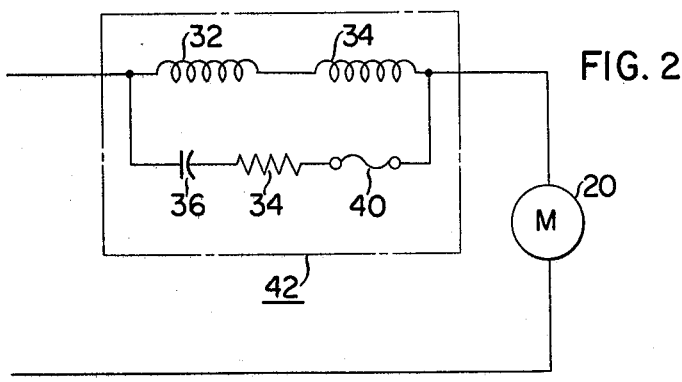
FIG. 2 is a schematic circuit diagram of a modification of the filter shown in FIG. 1 and connected to the motor also shown in FIG. 1.

FIG. 2 shows a modification of the filter 42 as illustrated in FIG. 1. The arrangement illustrated comprises the series combination of the capacitor 36, the resistor 38 and the fuse 40 connected across a series combination of the direct current reactor 32 and the interpole winding 34 rather than across the armature 20. Thus it is seen that the filter 42 as shown in FIG. 2 includes a parallel resonance circuit. The parallel resonance circuit has a resonance frequency selected to be equal or extremely close to the fundamental frequency of the ripple components involved. The direct current reactor 32 may be omitted or have a very low inductance depending on the inductance of the interpole winding 34.

Figure 3:
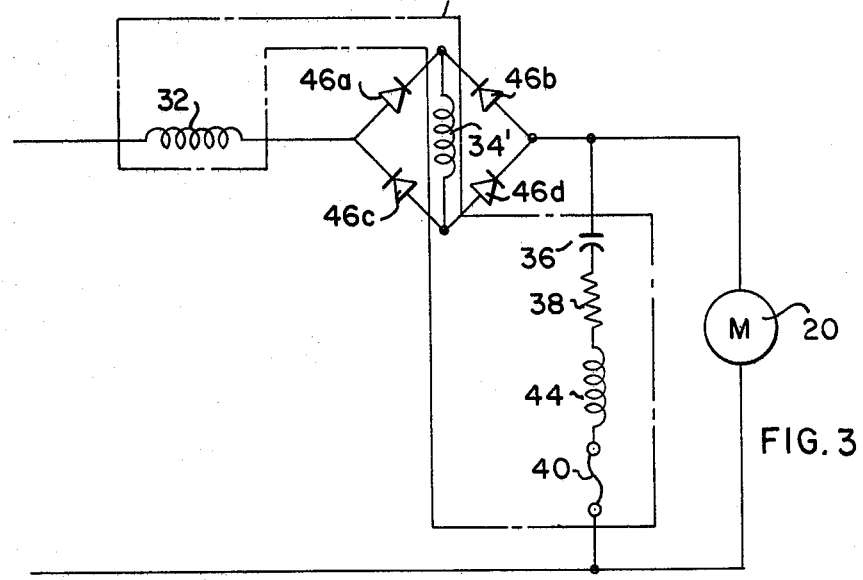
FIG. 3 is a schematic circuit diagram of a modification of the arrangement shown in FIG. 2.

In FIG. 3 the interpole winding 34 shown in FIG. 1 is replaced by a single phase full-wave rectifier bridge including four semiconductor diodes 46a, 46b, 46c and 46d and a series field winding 34' connected across a pair of directcurrent output terminals of the bridge. That is, the series field winding 34' is serially connected to the armature 20 while it is connected in the rectifier bridge 46a-46b-46c-46d.

Thus it is seen that the filter 42 includes, in addition to the components 32, 36, 38, 44 and 40, the series field winding 34', as one of the element, for absorbing the ripple components. Thereby the direct current reactor 32 can be made small-sized.

In the arrangement of FIG. 3 the series field winding 34' always has a field current flowing therethrough in a predetermined direction regardless of the direction of flow of the armature current. This is due to the diodes 46a, 46b, 46c and 46d connected into the rectifier bridge. This permits the armature 20 to produce either a power running torque or a braking torque.

In summary, the present invention includes a filter connected to an armature of a direct current motor having an interpole winding or a series field winding or to the interpole or series field winding, the filter including, as one of the elements thereof, an inductance provided by the interpole or series field winding to remove current ripples produced due to a static Ward-Leonard devide involved.

Thus the present invention is advantageous in that the level of the noise generated from an elevator motor controlled by a thyristor type Ward-Leonard system can be reduced. Also the present invention provides an economical structure because a direct current reactor for preventing the armature current from increasing excessively if any of thyristors in the Ward-Leonard system fail to turn off may be omitted or have a very low inductance.

While the invention has been illustrated and described in conjunction with several preferred embodiments thereof it is to be understood that numerous changes and modifications may be resorted to without departing from the spirit and scope of the present invention. For example, the present invention is equally applicable to compound motors.

What we claim is:

1. An elevator control system comprising a direct current motor including an armature and a selected one of an interpole winding and a series field winding serially connected to said armature to operate an elevator car, static Ward-Leonard means coupled to said motor for controlling said motor, said static Ward-Leonard means being capable of generating current ripples, and series resonance filter means having a resonance frequency at least extremely close to the fundamental frequency of said current ripples from said static Ward-Leonard means, said series resonance filter means being connected across said armature of said direct current motor to reduce noise produced from said direct current motor.

2. An elevator control system comprising a direct current motor including an armature and a selected one of an interpole winding and a series field winding serially connected to said armature, a static Ward-Leonard means coupled to said motor for controlling said motor, said static Ward-Leonard means being capable of generating current ripples, and filter means connected across said winding of said direct current motor to form a parallel resonance circuit, said parallel resonance circuit having a parallel resonance frequency selected to be at least extremely close to the fundamental frequency of said current ripples from said static Ward-Leonard means thereby to reduce noise produced by said direct current motor.

* * * * *